United States Patent
Goswami et al.

(10) Patent No.: US 9,444,899 B2
(45) Date of Patent: Sep. 13, 2016

(54) USE OF INTERNET INFORMATION SERVICES LOGGING TO COLLECT USER INFORMATION IN AN ASYNCHRONOUS MANNER

(71) Applicant: Microsoft Technology Licensing, LLC, Redmond, WA (US)

(72) Inventors: Saranga Goswami, Redmond, WA (US); Fang Wang, Renton, WA (US); Jay Kothari, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 13/727,032

(22) Filed: Dec. 26, 2012

(65) Prior Publication Data

US 2014/0181262 A1 Jun. 26, 2014

(51) Int. Cl.
G06F 15/173 (2006.01)
H04L 29/08 (2006.01)

(52) U.S. Cl.
CPC ............... *H04L 67/22* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,636,961 B1 | 10/2003 | Braun et al. | |
| 6,965,928 B1 | 11/2005 | Cox et al. | |
| 7,577,948 B2 | 8/2009 | Zomaya et al. | |
| 7,877,461 B1 * | 1/2011 | Rimmer | 709/217 |
| 8,024,450 B1 | 9/2011 | Shiyafetdinov et al. | |
| 8,108,854 B1 | 1/2012 | Wiggins et al. | |
| 2001/0056482 A1 * | 12/2001 | Lewis et al. | 709/224 |
| 2002/0032768 A1 * | 3/2002 | Voskuil | 709/224 |
| 2002/0087282 A1 * | 7/2002 | Millard | 702/108 |
| 2003/0208640 A1 * | 11/2003 | Just | 709/330 |
| 2010/0242106 A1 * | 9/2010 | Harris et al. | 726/15 |
| 2013/0290503 A1 * | 10/2013 | Rajkumar et al. | 709/223 |

OTHER PUBLICATIONS

"Troubleshoot issues you might see when you run Office 365 desktop suite," posted on Jun. 4, 2011 at <https://support.office.com/en-us/article/Troubleshoot-issues-you-might-see-when-you-run-Office-365-desktop-setup-c14e8b42-179e-46a6-9b46-e6a9a4d358fe?ui=en-US&rs=en-001&ad=US>.*
"Windows Info Portal Discover Microsoft, Master Windows, and Compute with Ease," posted on May 5, 2011 on <http://obieosobalu.wordpress.com/2011/05/05/office-365-deployment-readiness-tool-beta-office-365-beta-deployment-guide-for-enterprises-now-available-from-microsoft/>.*
"Office 365 Deployment Readiness Tool Released," posted on May 9, 2011 at <http://howdouc.blogspot.com/2011/05/office-365-deployment-readiness-tool.html>.*

(Continued)

*Primary Examiner* — Scott B Christensen
(74) *Attorney, Agent, or Firm* — Tom Wong; Micky Minhas

(57) ABSTRACT

Techniques for collecting information about client devices utilizing IIS logging in a secure and asynchronous manner are described. A method may comprise collecting information associated with one or more programs resident on a client device. A request is generated to access a webpage associated with one or more of the client devices where a query string, including at least a portion of the collected information, is attached to the request to access the webpage. The request to access the webpage along with the query string is sent to a server supporting the webpage for storage within an IIS log.

20 Claims, 10 Drawing Sheets

(56) References Cited

OTHER PUBLICATIONS

"How to use the Office 365 Desktop Readiness Tool to assess the compatibility of a desktop for Office 365", Retrieved at <<http://support.microsoft.com/kb/2644173>>, Retrieved Date: Sep. 26, 2012, pp. 2.

"EMCO Network Software Scanner description", Retrieved at <<http://www.softpedia.com/get/Network-Tools/Network-Information/EMCO-Network-Software-Scanner.shtml>>, Retrieved Date: Sep. 26, 2012, pp. 2.

Faas, Ryan, "Apple Remote Desktop 3, Part 3: Gathering Information about Remote Computers", Retrieved at <<http://www.peachpit.com/articles/article.aspx?p=606977>>, Sep. 15, 2006, pp. 4.

"Oracle® Enterprise Manager", Retrieved at <<http://docs.oracle.com/cd/E24628_01/install.121/e28547.pdf>>, Sep. 2012, pp. 6.

* cited by examiner

*800*

USE OF INTERNET INFORMATION SERVICES LOGGING TO COLLECT USER INFORMATION IN AN ASYNCHRONOUS MANNER

BACKGROUND

Various personal devices including personal computers (PCs) have become essential tools for businesses, organizations and personal use. PCs may be connected via a computer network to enable communication between users within and outside an organization. Administration of such networks and the management of hundreds and thousands of PCs that are included in these networks as well as other networked devices within an organization is a time consuming and complicated responsibility.

The various devices used within an organization typically run application programs including operating systems, web browsers and productivity suites. These application programs are installed on these devices have disparate versions. Managing version information for these applications on each client device is beneficial when determining compatibility for network-wide upgrades and or application migrations for an organization. For example, only particular versions of operating systems, and application programs will work with certain new/upgraded applications including, for example, web based communication platforms. If a client device does not have the correct version of installed application programs, the new platform or application may not function or communicate properly with other devices or may not be able to take advantage of all the newly available system features. Collecting version information for existing programs including, for example, operating systems, web browsers and productivity suites installed on a client device may be beneficial when determining the readiness of specific machines within an organization in order to migrate new/updated applications to each device. However, collecting this version information in a secure, efficient and cost effective manner is time consuming and often inaccurate. For example, one common way administrators within organizations collect version information is by sending an email communication asking for pertinent version information of certain applications or programs installed on a client device. This requires a user to access the version information on their own machine and reply, often with another email communication, to the administrator. Often times, the users either do not respond to the administrator's email request or respond with incorrect information leading to incomplete and inaccurate version information for an organization. In addition, tracking responses for each client device in an organization is time consuming and difficult to manage. Another common way administrators collect version information is by sending a script or sequence of coded instructions that a user runs on his/her machine. Once run, the results of the script are sent directly to the administrator or uploaded to a network shared location for the administrator to access. However, this requires the administrator to write scripts—often separate scripts for each application—and requires the users to actually run the scripts on their respective machines. In addition, decisions on whether or not existing application versions are compatible with new program implementations is best left to the sources of these new programs, not a network administrator which may lead to compatibility errors and failed installations. It is with respect to these and other considerations that the present improvements have been needed.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a readiness tool and system for collecting version information of existing programs and applications installed on client devices in an asynchronous manner to determine compatibility of these existing versions with the provisioning of additional services as well as identifying which users require system level updates to existing programs and applications. The tool utilizes IIS logging to collect version information associated with existing operating systems and programs from a user's PC or device. Once collected, the tool allows storage, sorting and retrieval of version information for each machine associated with an organization. In one embodiment, the readiness tool collects information associated with one or more programs resident on a client machine. The tool generates a request to access a webpage associated with the client device or organization to which the client device is associated. A query string including the collected version information is attached to the request to access the webpage. The request to access the webpage along with the query string is sent to access the webpage for storage within an internet information services (IIS) log for later retrieval and indexing. In another embodiment, the retrieved version information is compared to a minimum set of version values to determine if the one or more programs resident on the client machine satisfies a minimum version requirement so that these installed programs are compatible with provisioning of the new application. In another embodiment, a machine state value associated with a particular client device is determined based on the comparison of the retrieved version information and the minimum set of version values.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
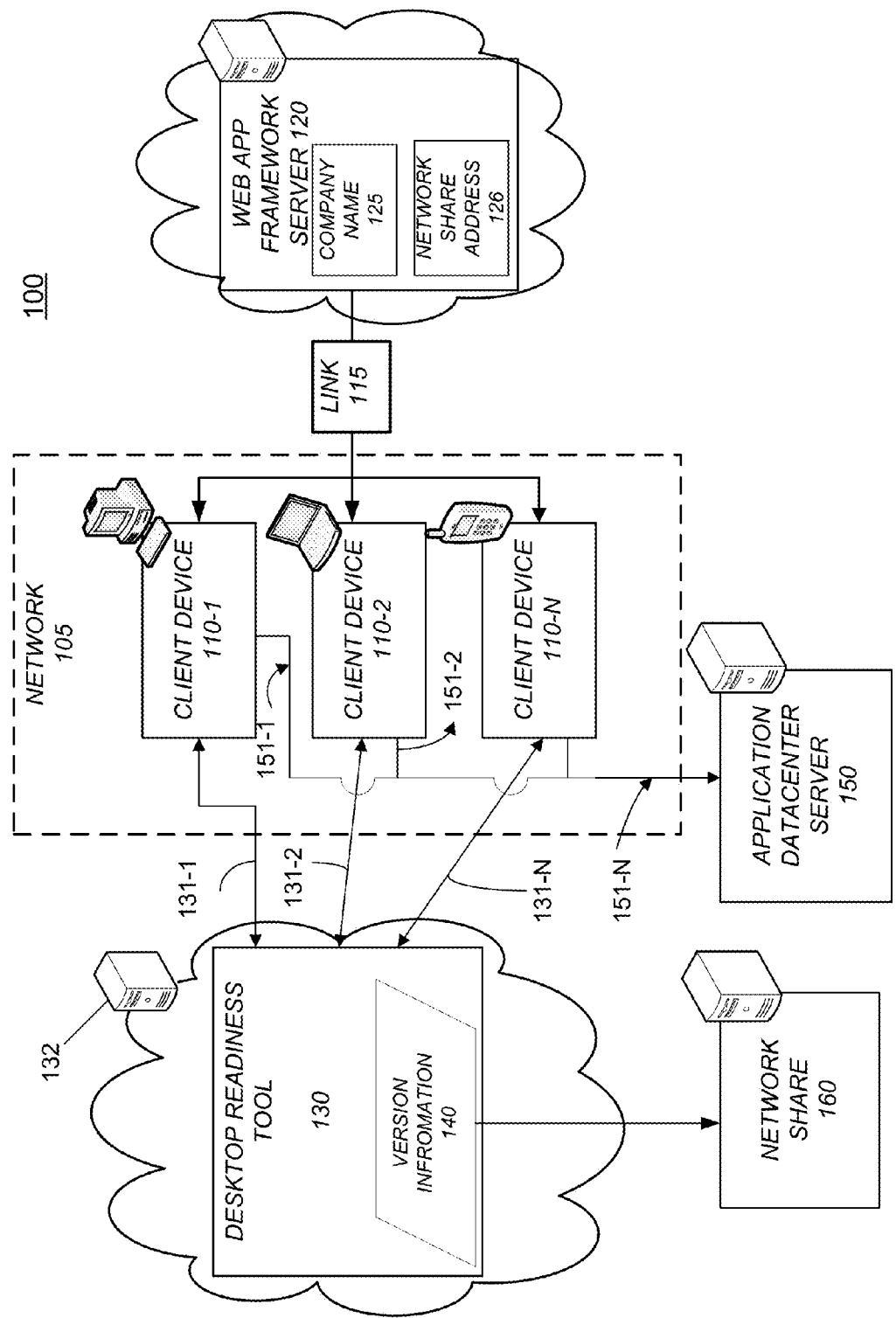
FIG. 1 illustrates a system that collects program version information to determine the readiness of client devices for particular program updates.

Various embodiments are generally directed to a system used to collect version information of application programs resident on a client device and determine the compatibility of such application programs with a system level implementation or upgrade. The system utilizes HS logging to provide a secure and asynchronous method to collecting, storing and analyzing the collected version data. In many cases company administrators do not know the versions of application programs such as, for example, operating systems, internet browsers and productivity suites resident on each user's machine. This version information may be critical to the success of system level implementations of new applications or even upgrades of the same application programs that utilize new features and functions. In particular, if the user's machines do not have the right versions of an operating system and/or application program, the company administrator would like to accurately and efficiently collect this information to determine which of the user's machines require updates, patches or new installations of the application programs before the system level implementation. However, collecting version information of a plurality of application programs resident on a plurality of user machines is time consuming, inefficient and often inaccurate.

A desktop readiness system generates a link from a web app framework server which is provided to each of a plurality of client devices or user machines associated with an organization or business. The link is used to access a desktop readiness tool, usually accessible from an application datacenter server, which is run on each of the client devices to examine and collect version information for particular application programs resident on the user's machine. The application programs for which version information is collected from the user machine typically correspond to those programs that interact, necessary for or are used by a program which is the subject of an organization wide implementation or installation. The desktop readiness tool generates a query string that includes the version information for each of the relevant program applications associated with a client device or machine. The desktop readiness tool generates a request to access a website assigned to the organization using a predetermined URL via a web client. An organization name and an associated network share may be entered in this website where the resulting version information retrieved by the desktop readiness tool may be sent/received. The query string containing the organization name and the network share information is contained in the link sent to the client device to run the desktop readiness tool. When run, the desktop readiness tool retrieves the organization name and the network share information provided in the link. The query string is attached to the request to access the webpage and is saved in HS logs when the URL is accessed. A keyword prefix may also be added by the desktop readiness tool to the query string to denote that the version information was supplied by the desktop readiness tool. An administrator may access the information saved in the IIS logs to determine which application programs are resident on user's machines within an organization or business as well as the readiness of those user's machines for a system level implementation or upgrade.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of programs, tools, threads, applications and/or modules that execute on an operating system running on a computing device, those skilled in the art will recognize that aspects may also be implemented in combination with other program modules. Generally, program tools include routines, programs, components, data structures, and other types of structures that perform particular tasks or implement particular abstract data types. Moreover, those skilled in the art will appreciate that embodiments may be practiced with other computer system configurations, including handheld devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

FIG. 1 illustrates a block diagram of a system 100 for collecting version information associated with one or more program applications on a client device. In one embodiment, for example, a plurality of client devices 110-1 . . . 110-N may be associated with a network 105 of an organization. It is worthy to note that the use of "N" is meant to be a positive integer, however the use of "N" for different devices or components of the system 100 does not necessarily imply a same number of different devices or components. Client devices 110-1 . . . 110-N are typically personal computers (PC), but may also include without limitation a mobile device, a personal digital assistant, a mobile computing device, a smart phone, a cellular telephone, a handset, pagers, a messaging device, a work station, a network appliance, a web appliance, a distributed computing system, multiprocessor systems, processor-based systems, consumer electronics, programmable consumer electronics, television, digital television, set top box, hub, gateway, bridge, switch, or combination thereof. Each of the client devices 110-1 . . . 110-N may run a plurality of client-based programs and applications. For example, each of the client devices may run a particular operating system such as, for example, MICROSOFT WINDOWS®. In addition, each client device may also run a particular web browser such as, for example, INTERNET EXPLORER® and a productivity suite such as, for example, MICROSOFT® OFFICE. As mentioned above, an administrator of network 105 may need to collect version information for each of these client-based programs in order to determine compatibility with implementation of a new program or system such as, for example, the MICROSOFT OFFICE 365™ cloud computing application.

A link 115 is generated by web app framework server 120 and is provided to each of the client devices 110-1 . . . 110-N within network 105. Although network 105 is illustrated as a single network, it should be understood that network 105 may comprise any number of separate and/or interconnected networks as described in more detail with reference to FIG. 8. The link 115 is a Uniform Resource Locator (URL) that's hosted by server 132 used to run desktop readiness tool 130 on a respective client device 110-1 . . . 110-N. The link 115 may be provided to each of the client devices through an email communication or other sharing mechanism. The link 115 may be generated from a web app framework server 120 utilizing an .aspx page, for example, that's associated with a particular new program implementation. By way of example, the link 115 may include the name of the company or organization 125 for which the version information is to be collected. A network share address 126 may also be included if the version information collected from the readiness tool 130 is to be stored in a shared environment in addition to IIS logs as described in more detail below. By way of example, when the desktop readiness tool 130 runs on each client device 110-1 . . . 110-N, it extracts the company name 125 and the network share address 126 from link 115. If the link 115 is created by web app framework server 120 without a company name 125, then the link is generated with the company name as "Not Found" when the version information is written to the IIS log. Similarly, if link 115 is created by web app framework server 120 without network share address 126, then the link is generated without a network share address and the version information collected by the desktop readiness tool 130 is not written to any network share. Although the web app framework server 120 and servers 132, 150 are shown and described as separate servers, this has been done for ease of explanation. It should be understood that these servers may be implemented as one or more servers, server farm and/or distributed server architecture. Throughout this specification, when the term "server" is used it generally refers to a computing device executing one or more software programs typically in a networked environment.

The link 115 is used to access desktop readiness tool 130 via connections 131-1 . . . 131-N from each client device 110-1 . . . 110-N to server 132. As noted above, each user of the client devices 110-1 . . . 110-N receives link 115 associated with their organization via an email communication or other sharing mechanism. Connections 131-1 . . . 131-N may be logical connections usually over a global communications network, for example, the Internet. The client devices 110-1 . . . 110-N generally communicate with the various components within system 100 including servers 120, 132, 150 and 160 over one or more networks utilizing standard TCP/IP communication and SOAP (Simple Object Access Protocol) messaging. Each user clicks on the received link 115 which launches desktop readiness tool 130 via server 132. Desktop readiness tool 130 resides on server 132, but runs on each of the client devices 110-1 . . . 110-N once link 115 is initiated by a respective user of each client device. The desktop readiness tool 130 collects the program information such as, for example, the current version of one or more of a plurality of programs resident on each of the client devices 110-1 . . . 110-N by reading the version information stored in corresponding registries associated with each of the plurality of programs. For example, desktop readiness tool 130 may collect version information associated with an operating system, web browser and productivity suite on each of the respective client devices 101-1 . . . 101-N which is typically a numeric value. This numeric value may be compared by the desktop readiness tool 130 to a minimum version requirement as described in more detail below and/or may be mapped to a particular identifier that may be used for indexing and analysis. This comparison is used to determine if the version of the program or application is compatible with the system level update and/or new application implementation. The collected version information 140 for each of the client devices 110-1 . . . 110-N is sent to network share 160 if a network share was included in link 115.

Once the version information is collected by the desktop readiness tool 130 from each of the client devices 110-1 . . . 110-N, the desktop readiness tool 130 initiates connections 151-1 . . . 151-N from each client device to a webpage URL via a web browser from each of the client devices 110-1 . . . 110-N, thereby creating respective web clients. In other words, the desktop readiness tool 130 opens up the web browser resident on each of the client devices 110-1 . . . 110-N and initiates connections 151-1 . . . 151-N to a webpage corresponding to the URL defined in the desktop readiness tool. This process may be a background thread that runs on each of the client devices 110-1 . . . 110-N, may be accessed using standard HTTP (Hypertext Transfer Protocol) and may optionally employ encryption (e.g. HTTPS) to provide security for users of client devices 110-1 . . . 110-N and the associated information. The webpage URL may be associated with an anonymous webpage in that the webpage is blank and is only used to collect version information for the desktop readiness tool and is defined in the configuration file of the desktop readiness tool 130 supported by application datacenter server 150. The webpage associated with the anonymous URL is maintained on server 150 for a program implementation and/or support. For example, server 150 may be a MICROSOFT OFFICE 365 datacenter server which supports the MICROSOFT OFFICE 365 cloud computing application and the anonymous URL may correspond to a webpage supported by the OFFICE 365 datacenter.

When each of the client devices 110-1 . . . 110-N accesses the anonymous webpage via respective web clients, the desktop readiness tool 130 appends a query string to the anonymous URL. Each query string comprises version information from the respective application programs retrieved from each of the client devices 110-1 . . . 110-N by desktop readiness tool 130. This version information is saved in IIS logs when the URL supported by the application datacenter server 150 is accessed. A keyword prefix may be added to each query string by desktop readiness tool 130 to indicate that a particular log entry was reported by the desktop readiness tool. The version information in the form of the query string is stored in the IIS logs and may be examined to determine the readiness of an organization for a particular system level update and/or implementation. In addition, the version information 140 may also be reported back to each user of the client devices 110-1 . . . 110-N via the readiness tool 130 to notify a user whether or not their respective client device has compatible versions of particular programs or applications which would work with a planned system level upgrade or implementation.

Figure 2A:
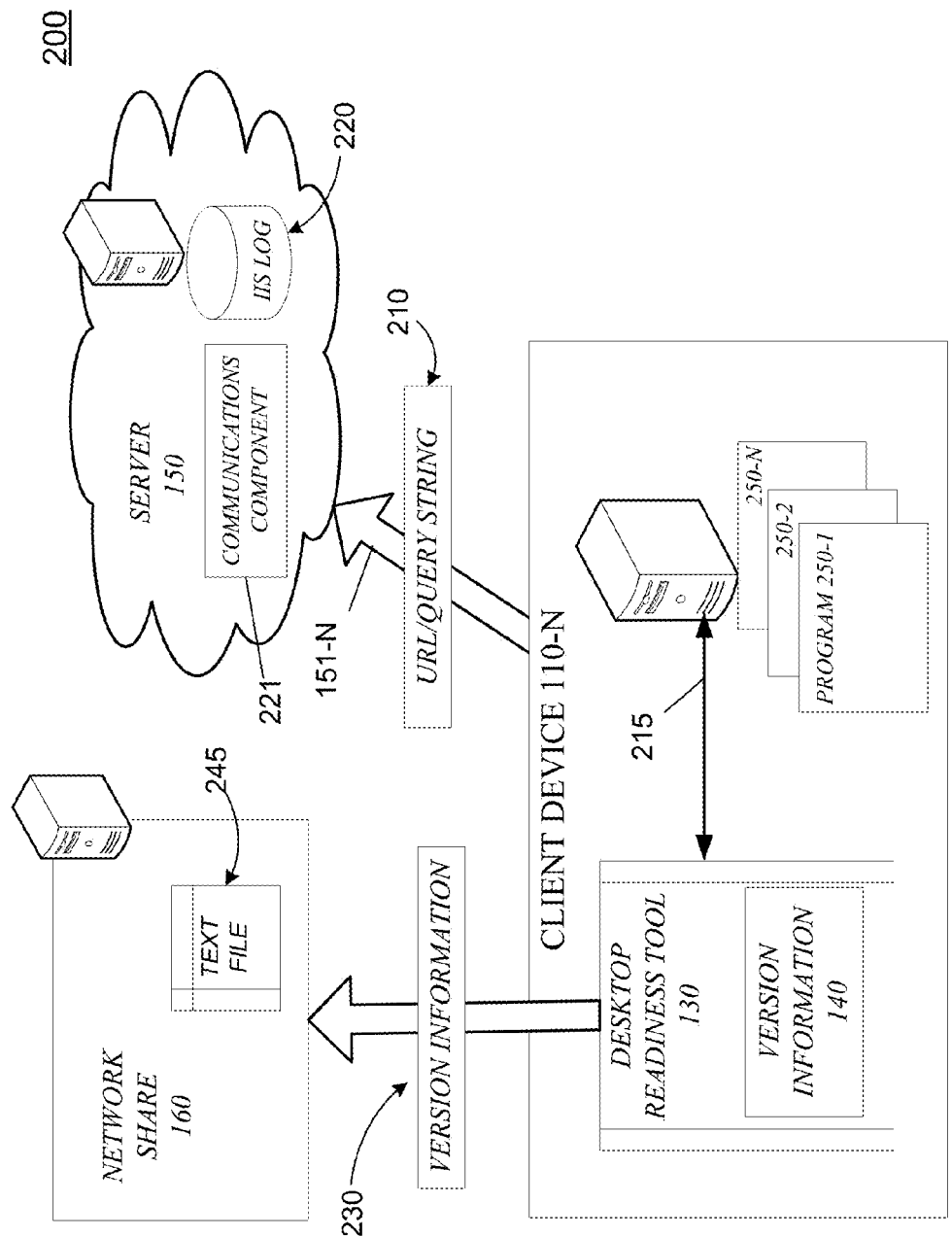
FIG. 2A illustrates an embodiment of a desktop readiness tool utilized in the system of FIG. 1.

FIG. 2A illustrates a block diagram of a particular client device 110-N and the data flow associated with the desktop readiness tool 130. Although the desktop readiness tool 130 is shown within client device 110-N, the tool resides on server 132 and is run on the client device based on initiation of link 115 as described with reference to FIG. 1. Client device 110-N may be, for example, a PC that has a plurality of application programs 250-1 . . . 250-N of a particular version stored in memory. Client device 110-N may include, for example, an operating system, a productivity suite and a web browser each of which has an associated version. The desktop readiness tool 130 reads and collects this version information for each of the applications programs 250-1 . . . 250-N resident on the client device 110-N via communications connection 215. For example, the desktop readiness tool 130 may collect version information for an operating system (e.g. program 250-1) such as WINDOWS®, an internet browser (e.g. program 250-2) such as INTERNET EXPLORER® and a productivity suite (e.g. program 250-N) such as MICROSOFT® OFFICE all resident on device 110-N. With respect to the operating system example, the desktop readiness tool 130 reads the value from the field "CURRENTVERSION" under the following registry location in client device 110-N to obtain such version information:

HKEY_LOCAL_MACHINE\Software\Microsoft\
Windows\NT\CurrentVersion

This version information is typically a numeric value and may be mapped to a user friendly name and sent to a network share 160 as version information 140. Similarly, the desktop readiness tool 130 may also collect version information for another application such as, for example, a default web browser. To obtain this version information, the desktop readiness tool 130 first identifies which internet browser is the default web browser by reading the information from the field "DEFAULT" under the following registry location in an exemplary client device 110-N:

HKEY_LOCAL_MACHINE\Software\Clients\Start
Menuinternet.

Once the desktop readiness tool 130 identifies which web browser is the default web browser, it then proceeds to a registry location to find the location of the executable binary contained in the file system of the client device. The desktop readiness tool 130 may proceed to the following exemplary registry:

HKEY_LOCAL_MACHINE\Software\Clients\Start
Menuinternet_[default web browser identification]
\shell\open\command to retrieve the full path of the executable binary stored in the file system associated with the exemplary client device 110-N. The desktop readiness tool 130 then retrieves the version information, which is typically numeric, associated with this executable binary and may compare this version information with a minimum version value expected for the particular program upgrade or implementation. In addition, the desktop readiness tool may also collect the version information for other web browsers resident on the client device 110-N that may not be the default web browser by reading the information from the "DEFAULT" field under the same registry key noted above.

Similarly, the desktop readiness tool 130 collects the version information for the applications within the most recently installed version of the productivity suite resident on the exemplary client device 110-N. For example, if MICROSOFT OFFICE 2007 and 2010 represents a productivity suite having application programs 250-1 . . . 250-N installed on client device 110-N, but OFFICE 2007 was installed on the client device more recently than OFFICE 2010, then the desktop readiness tool will return the version of OFFICE 2007 as the most recent version on the client device. The desktop readiness tool 130 determines the version information for a defined set of applications 250-1 . . . 250-N included in the productivity suite installed on exemplary client machine 110-N and compares this information to a set of minimum build numbers associated with each of the applications within the productivity suite. In particular, the desktop readiness tool retrieves the location of a binary value for each application 250-1 . . . 250-N within the productivity suite by reading the DEFAULT key in the exemplary registry location:

HKEY_LOCAL_MACHINE\Software\Microsoft\
Windows\CurrentVersion\App Paths\[application name].exe.

The desktop readiness tool 130 then reads the file version information from the location information for the application programs 250-1 . . . 250-N retrieved from the above registry and compares it to a minimum version number stored in the desktop readiness tool to determine compatibility of each application within the productivity suite. As stated above, the desktop readiness tool 130 has a defined set of minimum version requirements for particular ones of the application programs contained in the productivity suite (e.g. 250-N), collects the associated version information 140 for each of these particular ones of the application programs from the registry location and compares the retrieved version information with the minimum version requirements stored in the desktop readiness tool 130 to determine compatibility of the application programs resident on the exemplary client device 110-N.

Once the version information 140 is collected by the desktop readiness tool, this information is sent and stored in network share 160 if a network share address was included in link 115. This version information may be stored as a text file 245 and may be examined to determine the readiness of client devices within network 105 for a system level upgrade or implementation.

After collecting the version information, the desktop readiness tool 130 initiates a connection 151-N from client device 110-N to an anonymous web page supported by server 150 via a web browser from client device 110-N, thereby creating a web client. In particular, the desktop readiness tool 130 opens up the web browser resident on client device 110-N and initiates a connection 151-N to a webpage supported by server 150 corresponding to a URL defined in the desktop readiness tool. When client device 110-N accesses the anonymous webpage via the respective web client, the desktop readiness tool 130 sends a request 210 which comprises the anonymous URL and a query string to server 150 which is received by communications component 221 resident on server 150. The query string portion of request 210 comprises version information for the programs 250-1 . . . 250-N retrieved from the client device 110-N by desktop readiness tool 130. The communications component 221 reads the request to access the webpage and provides the request, together with the query string to a storage device 220 which saves it as an IIS log. In other words, when the server 150 receives a request to access the anonymous webpage from the desktop readiness tool 130, the request and the attached query string are saved within the IIS log 220. Each time the URL associated with the anonymous webpage is accessed from a client device (e.g. 110-N) via a web client, the request and the query string are saved in IIS log 220 of server 150.

Figure 2B:
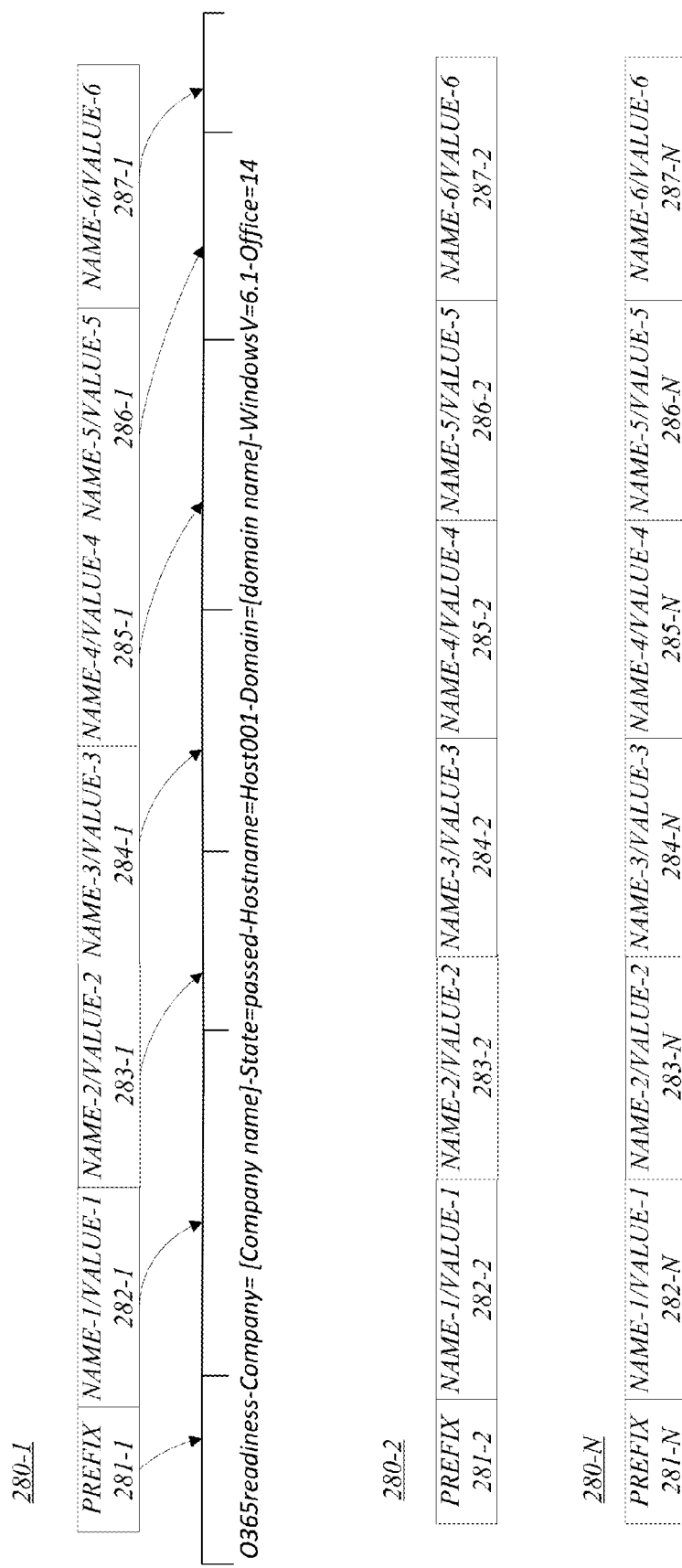
FIG. 2B illustrates exemplary query strings utilized in the system of FIG. 1.

FIG. 2B illustrates exemplary query strings 280-1 . . . 280-N which are part of a request (e.g. 210) saved in the IIS log 220. Each query string 280-1 . . . 280-N corresponds to version information for a particular client device 110-1 . . . 110-N and is stored as a separate line in IIS log 220. In addition, each query string 280-1 . . . 280-N includes a prefix 281-1 . . . 281-N and a plurality of name/value pairs 282-N . . . 287-N. In particular, prefix 281-1 . . . 281-N represents a keyword indicating that the version information saved in the IIS log 220 was generated by the desktop readiness tool 130 for a particular client device. Each query string 280-1 . . . 280-N also includes a plurality of "name/value" pairs 282-1 . . . 282-N, 283-1 . . . 283-N, 284-1 . . . 284-N, 285-1 . . . 285-N, 286-1 . . . 286-N, 287-1 . . . 287-N where each name/value pair is associated with a particular one of a plurality of programs 250-1 . . . 250-N resident on a client device 110-1 . . . 110-N and the corresponding version information of each one of those plurality of programs. For example, query string 280-1 may have been generated by desktop readiness tool 130 for client device 110-1 and comprise prefix 281-1 having keyword "O365readiness" that indicates that the query string was generated by desktop readiness tool 130 for the MICROSOFT OFFICE 365 implementation.

Query string 280-1 may also include a first name/value pair 282-1 which corresponds to the company or organization name for which client device 110-1 is associated with and may include "Company" as the Name and "Company Name" as the Value. Query string 280-1 also includes name/value pair 283-1 which may represent the "state" of the particular client device 110-N as the Name and "passed" as the Value which indicates that the version information for the programs 250-1 . . . 250-N resident on this client device are compatible with a system upgrade or implementation as described in more detail with respect to FIG. 4. Query string 280-1 may also include name/value pair 284-1 which comprises "Hostname" as the Name and "Host001" as the Value. Query string 280-1 also includes name/value pair 285-1 which comprises "Domain" as the Name and "domain name" as the value. Query string 280-1 may also includes name/value pair 286-1 which comprises the name of a program 250-1 . . . 250-N resident on client device 110-1 as the Name and the version number as the Value. In this example, the Name for the name/value pair 286-1 is the WINDOWS operating system and the Value is 6.1 corresponding to the version information associated with the WINDOWS operating system resident on client device 110-1. Query string 280-1 also includes name/value pair 287-1 which comprises the name of a program 250-1 . . . 250-N resident on client device 110-1 as the Name and the version number as the Value. In this example, the Name for the name/value pair 287-1 is the OFFICE productivity suite and the Value 14 is the version information associated with the OFFICE application resident on client device 110-1. Although particular name/value pairs have been described above with respect to query string 280-1 as well as a particular number of such pairs, any number of name/value pairs may be employed and the embodiments are not limited in this context.

Figure 3:
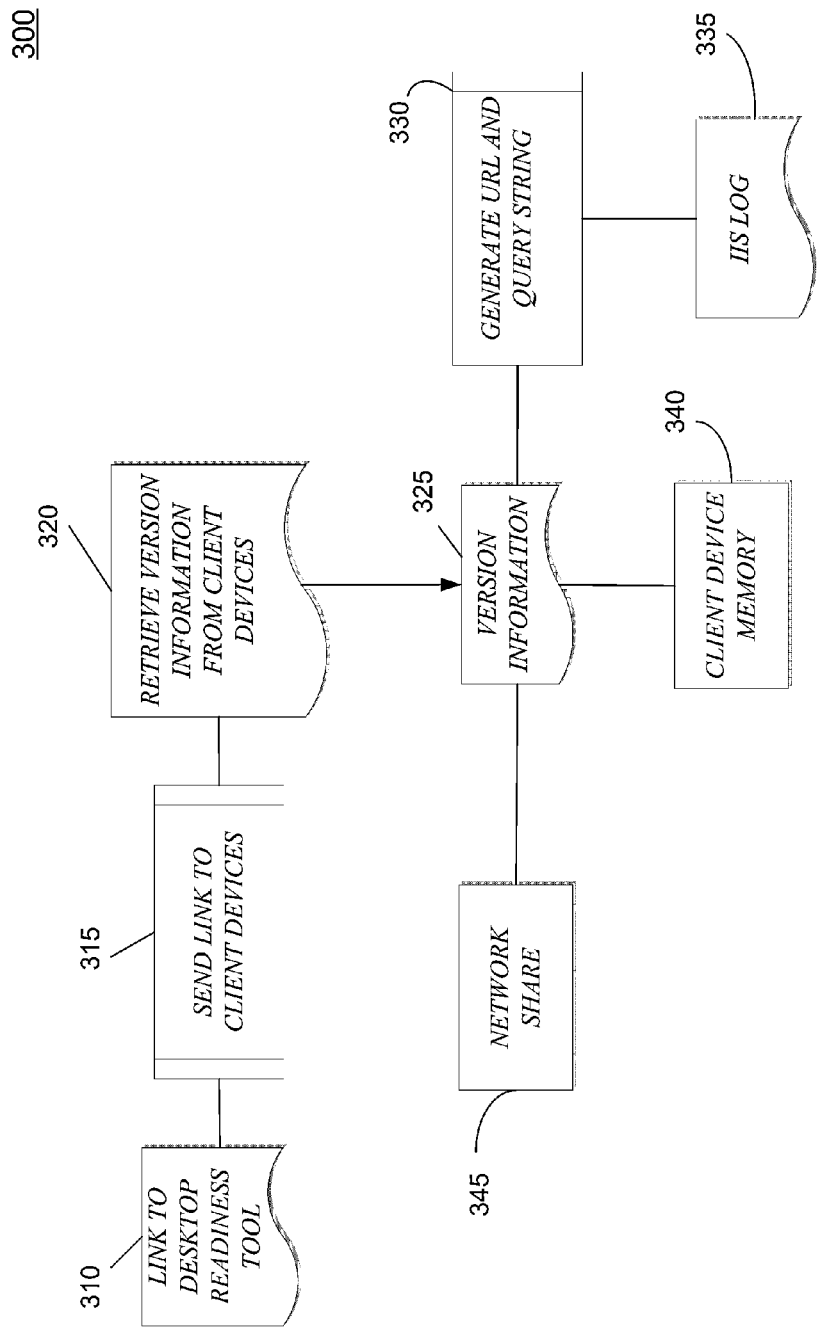
FIG. 3 illustrates an exemplary data flow utilizing the system of FIG. 1.

FIG. 3 illustrates an exemplary data flow diagram for the system shown in FIG. 1. In particular, a link (e.g. 115) to the desktop readiness tool 130 is generated at 310 by web app framework server 120. The link is sent to each of the client devices 110-1 . . . 110-N within network 105 at block 315. The link is used to access desktop readiness tool 130 which is run on each of the client device 110-1 . . . 110-N to retrieve version information associated with the application programs resident on each client device at block 320. This version information 325 is used to generate a query string which is attached to a web page URL generated by desktop readiness tool 130 at block 330. Generally, whenever a user of client device 110-1 . . . 110-N attempts to access Web content on a server that is running IIS through HTTP or FTP (File Transfer Protocol), IIS returns a status code that indicates whether the attempt to access the Web content was successful or not successful. This status code is recorded and stored in the IIS log and may also be displayed in the user's web browser or FTP client. In the present case, the URL generated by the desktop readiness tool is used to access an anonymous webpage supported by server 150, for example, which defines a web client between the client device and the server 150. Each time a user running the desktop readiness tool 130 on their client device 110-1 . . . 110-N accesses this URL, the request is stored in the IIS log associated with server 150. Since a query string (e.g. 280-N) containing version information of the application programs resident on the corresponding client device is attached to the URL, this query string is also saved to the IIS log at block 335 where each log entry corresponds to a particular client device. In this manner, a user need only click the link (e.g. 115) provided to the desktop readiness tool to collect and save version information of a plurality of application programs resident on the client device in a secure and asynchronous manner. Asynchronous is meant to reflect the process of collecting, retrieving and reporting version information associated with application programs resident on a client device that may be stored and retrieved from the IIS log associated with server 150. In addition, the desktop readiness tool may also be configured to save the version information 325 included in the query string 280-N to a memory location 340 resident on the corresponding client device 110-1 . . . 110-N. If a network share was defined in the generation of link 115, then the version information 325 collected from the readiness tool 130 is to be stored in a shared environment in addition to IIS log 335 at block 345.

Figure 4A:
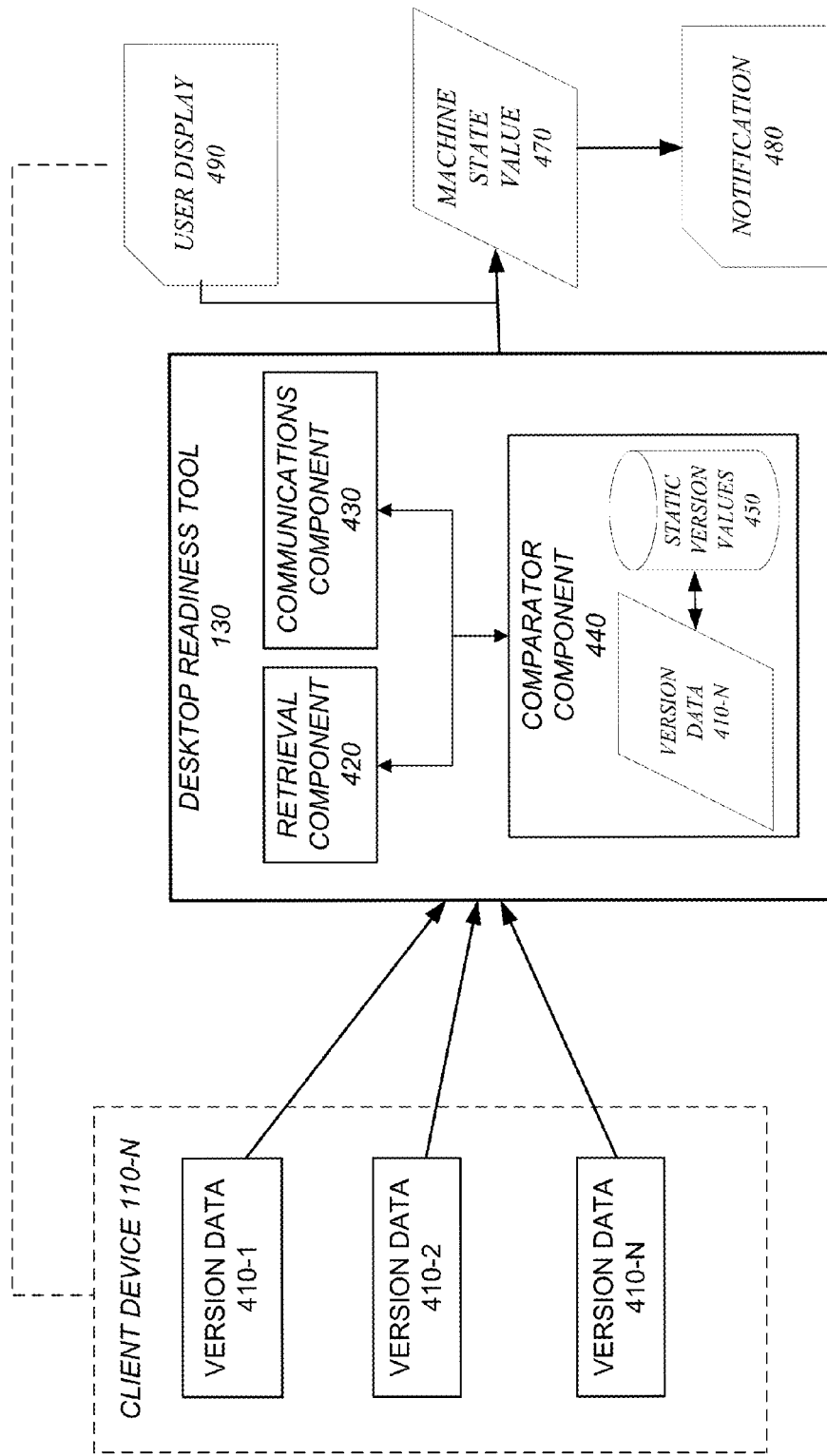
FIG. 4A illustrates an embodiment of a desktop readiness tool utilizing a comparator component.

FIG. 4A illustrates an embodiment of desktop readiness tool 130 in which the retrieved version information is compared to predefined minimum version values (e.g. integers) to determine the state of a client device 110-1 . . . 110-N and whether or not the application programs (e.g. 250-1 . . . 250-N) resident on the client device (e.g. 110-N) are compatible with a system level implementation or upgrade. In particular, desktop readiness tool 103 includes a retrieval component 420 which is configured to collect the version information or data 410-1 . . . 410-N, usually in the form of integer values, from a corresponding client device 110-N as described with reference to FIG. 2. Desktop readiness tool 130 also includes a comparator component 440 which is configured to receive the collected version information 410-1 . . . 410-N corresponding to the versions of the application programs 250-1 . . . 250-N resident on the client device 110-N and compare it with static minimum version values 450 stored in a conventional memory device. The static minimum version values correspond to the minimum versions of the application programs 250-1 . . . 250-N required for a particular system level upgrade or implementation. If the collected version information 410-1 . . . 410-N is equal to or greater than the static minimum version values 450, then the comparator component sends a control directive to communications component 430 indicating that the version of the application program (e.g. 250-N) resident on a client device 110-N from which the version information was retrieved, is compatible with an intended upgrade or system level implementation that utilize such application programs. If the collected version information 410-1 . . . 410-N is less than the static minimum version values 450, then the comparator component sends a control directive to communications component 430 indicating that the version of a particular application program (e.g. 250-N) resident on the client device 110-N from which the version information was retrieved, is not compatible with an intended upgrade or system level implementation that utilize such application programs. For example, if a cloud computing architecture such as MICROSOFT OFFICE 365 is being implemented within an organization, each client device must have a minimum version of an operating system (e.g. WINDOWS), productivity suite (e.g. OFFICE) and internet browser (e.g. INTERNET EXPLORER) in order for MICROSOFT OFFICE 365 to fully function. These minimum version requirements are saved as static version data 450 for MICROSOFT OFFICE 365. The version information for the operating system (e.g. WINDOWS), productivity suite (e.g. OFFICE) and internet browser (e.g. INTERNET EXPLORER) resident on client device 110-N is collected by the desktop readiness tool 130 as version data 410-N and compared to the static version data 450 by comparator component 440. If the collected version data 410-N is equal to or greater than the static version data for each of the application programs, then a notification is generated indicating that the application programs, namely operating system (e.g. WINDOWS), productivity suite (e.g. OFFICE) and internet browser (e.g. INTERNET EXPLORER) resident on client device 110-N, are compatible with the MICROSOFT OFFICE 365 implementation. The version data 410-1 . . . 410-N may be converted between data schemas as needed to compare the version data for particular application programs (e.g. 250-N) with the static minimum version values 450 by comparator 440. This conversion may be included as part of retrieval component 420 and/or comparator component 440.

Desktop readiness tool 130 may be configured to aggregate the results between the comparison of version data 410-N and static version data 450 to determine the state of a particular machine. In particular, comparator component 440 determines if the version information for each of the operating system, internet browser, productivity suite as well as version information associated with any other program application meets the requirements for the system level implementation or update (e.g. MICROSOFT OFFICE 365). The comparator component 440 returns a binary machine state value 470 representing a "pass" or "failed" result to indicate whether or not the version data 410-N on the client device 110-N is compatible or not compatible with the system level implementation or update. The machine state value 470 may be included in notification 480 provided by communications component 430 of desktop readiness tool 130.

In another embodiment, the desktop readiness tool 130 may be configured to provide notification to a user of the compatibility of various programs such as, for example, an operating system, internet browser, productivity suite as well as any other program application defined by the desktop readiness tool as being required for an application system upgrade and/or implementation. Again, comparator component 440 is configured to receive the collected version data 410-1 . . . 410-N and compare it with static version data 450 stored in a conventional memory device. Depending on the result of this comparison, the desktop readiness tool is configured to provide a user display 490 associated with the client device 110-1 . . . 110-N via communications component 430 to indicate which of the exemplary operating system, productivity suite and/or internet browser versions meets the requirements for the system level implementation or upgrade for MICROSOFT OFFICE 365. In addition, comparator component 440 may also be configured to determine which of the exemplary operating system, productivity suite and/or internet browser versions will need to be upgraded to be compatible with the new system level application implementation (e.g. MICROSOFT OFFICE 365). Comparator component 440 sends this information to communications component 430 which communicates with a user display 490 associated with client device 110-N.

Figure 4B:
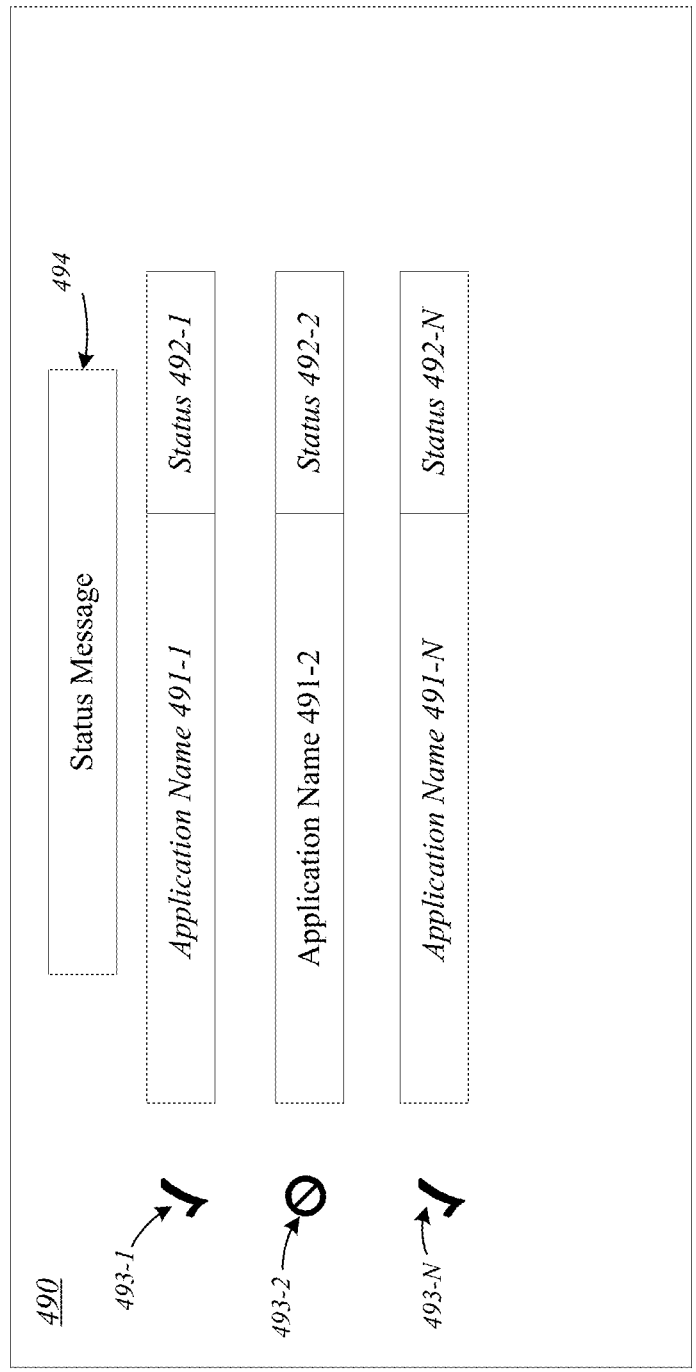
FIG. 4B illustrates an exemplary notification provided by the desktop readiness tool.

FIG. 4B illustrates an exemplary notification 490 provided by the desktop readiness tool 130. In particular, the desktop readiness tool may be configured to display the state of readiness for each application resident on the client device. The display may include the identity of the application 491-1 . . . 491-N for which version information was obtained by the desktop readiness tool 130 as well as the associated status 492-1 . . . 492-N. The notification may also include a status indicator 493-1 . . . 493-N which provides visual indicia of the readiness of each application resident on a client device. The notification 490 may also include a header 494 that generally notifies a user of the purpose of the information contained in the notification 490.

Figure 5:
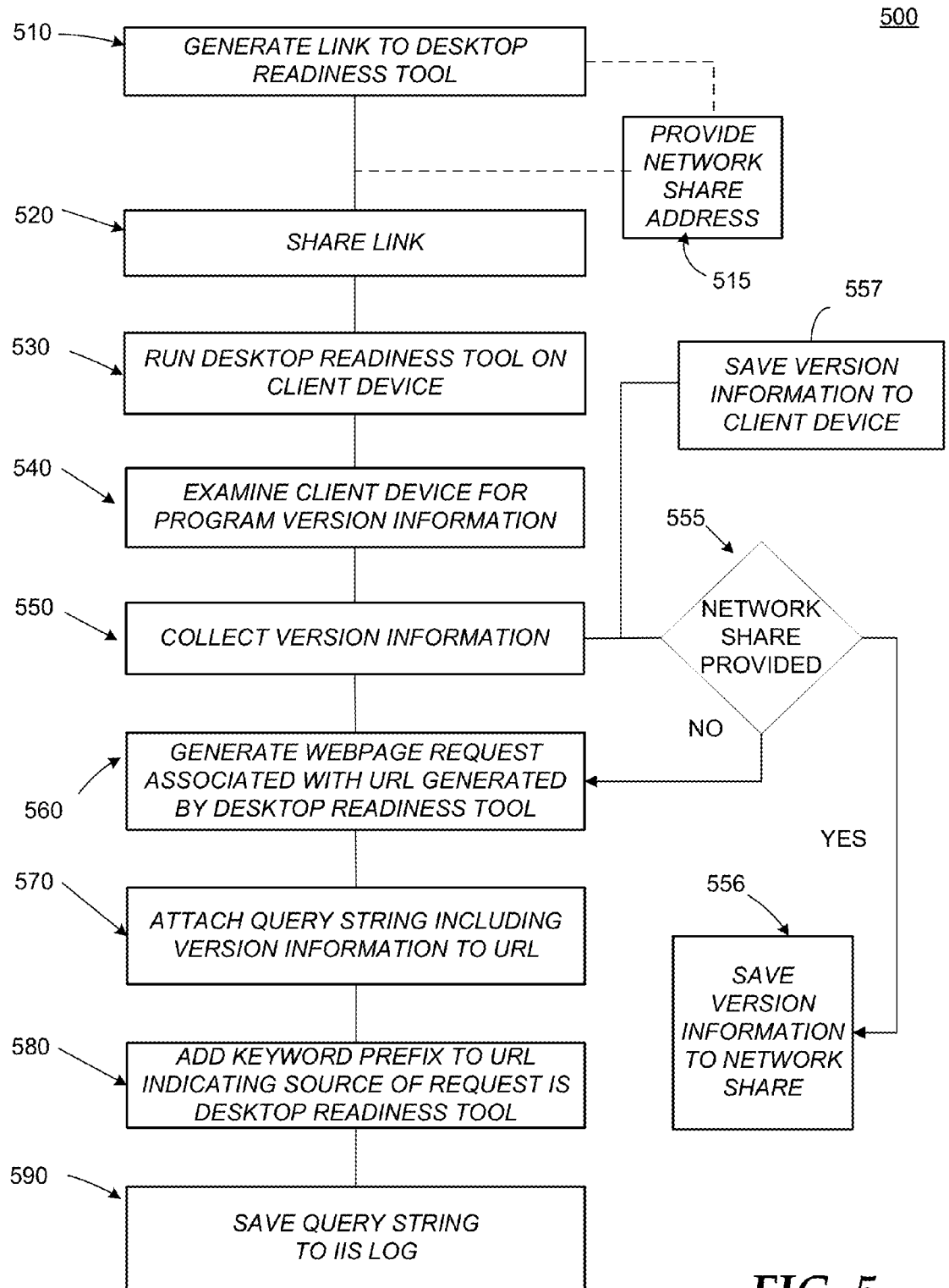
FIG. 5 illustrates an embodiment of a logic flow for the system of FIG. 1.

FIG. 5 illustrates an embodiment of a logic flow 500 for the system of FIG. 1. The logic flow 500 may be representative of some or all of the operations executed by one or more embodiments described herein. In the illustrated embodiment shown in FIG. 5, the logic flow 500 generates a link to the desktop readiness tool at block 510. For example, link 115 may be generated by web app framework server 120 and provided to each of the client devices 110-1 . . . 110-N within network 105. The link 115 may be generated from a web app framework server 120 utilizing an .aspx page, for example, that's associated with a particular new program implementation. If a network share address is provided at block 515, the network share address is included in the generated link. For example, if version information 140 is to be saved to a network share 160, an address for the network share is included in the generation of link 115.

The logic flow 500 shares the link with one or more of a plurality of client devices at block 520. For example, each user of the client devices 110-1 . . . 110-N receives link 115 associated with their organization via an email communication or other sharing mechanism. The desktop readiness tool is run on a client device at block 530. For example, each user clicks on the received link 115 which launches desktop readiness tool 130 via server 132. Although the desktop readiness tool 130 is resident on server 132, it runs on each of the client devices 110-1 . . . 110-N. A client device is examined for program version information at block 540. For example, the desktop readiness tool 130 examines each client device 110-1 . . . 110-N for version information associated with one or more of a plurality of application programs 250-1 . . . 250-N. The version information is collected at block 550. For example, the desktop readiness tool 130 may collect version information for an operating system (e.g. program 250-1) such as WINDOWS resident on a client device 110-N. The desktop readiness tool 130 reads, for example, the value from the field "CURRENTVERSION" under a particular registry location in client device 110-N to collect the associated version information.

A determination is made in the logic flow 500 at block 550 if a network share address was provided in the link 115 supplied to each client device 110-1 . . . 110-N. If a network share address was provided, then the collected version information is saved to the network share at block 556. If a network share address was not provided in the link 115, then the logic flow continues to block 560. The desktop readiness tool 130 may also be configured to save the version information to a corresponding client device 110-1 . . . 110-N from which the version information was retrieved at block 557. Once the version information is collected, a request to a web page associated with a URL is generated by the desktop readiness tool at block 560. For example, after collecting the version information the desktop readiness tool 130 initiates a connection 151-N from client device 110-N to an anonymous web page supported by server 150 via a web browser resident on the client device 110-N, thereby creating a web client. The logic flow continues to block 570 where a query string including the collected version information is attached to the generated URL. For example, when client device 110-N accesses the web page associated with the URL, the desktop readiness tool 130 sends a request which comprises the URL together with a query string to server 150. The query string portion of request 210 comprises version information for the programs 250-1 . . . 250-N retrieved from the client device 110-N by desktop readiness tool 130. The logic flow adds a keyword prefix to the URL indicating that the source of the request as from the desktop readiness tool at block 580. For example, each query string 280-1 . . . 280-N includes a prefix 281-1 . . . 281-N that represents a keyword indicating that the version information was generated by the desktop readiness tool 130 for a particular client device. The query string is saved to an HS log at block 590. For example, the URL/query string combination 210 is saved to IIS log 220 supported by server 150.

Figure 6:
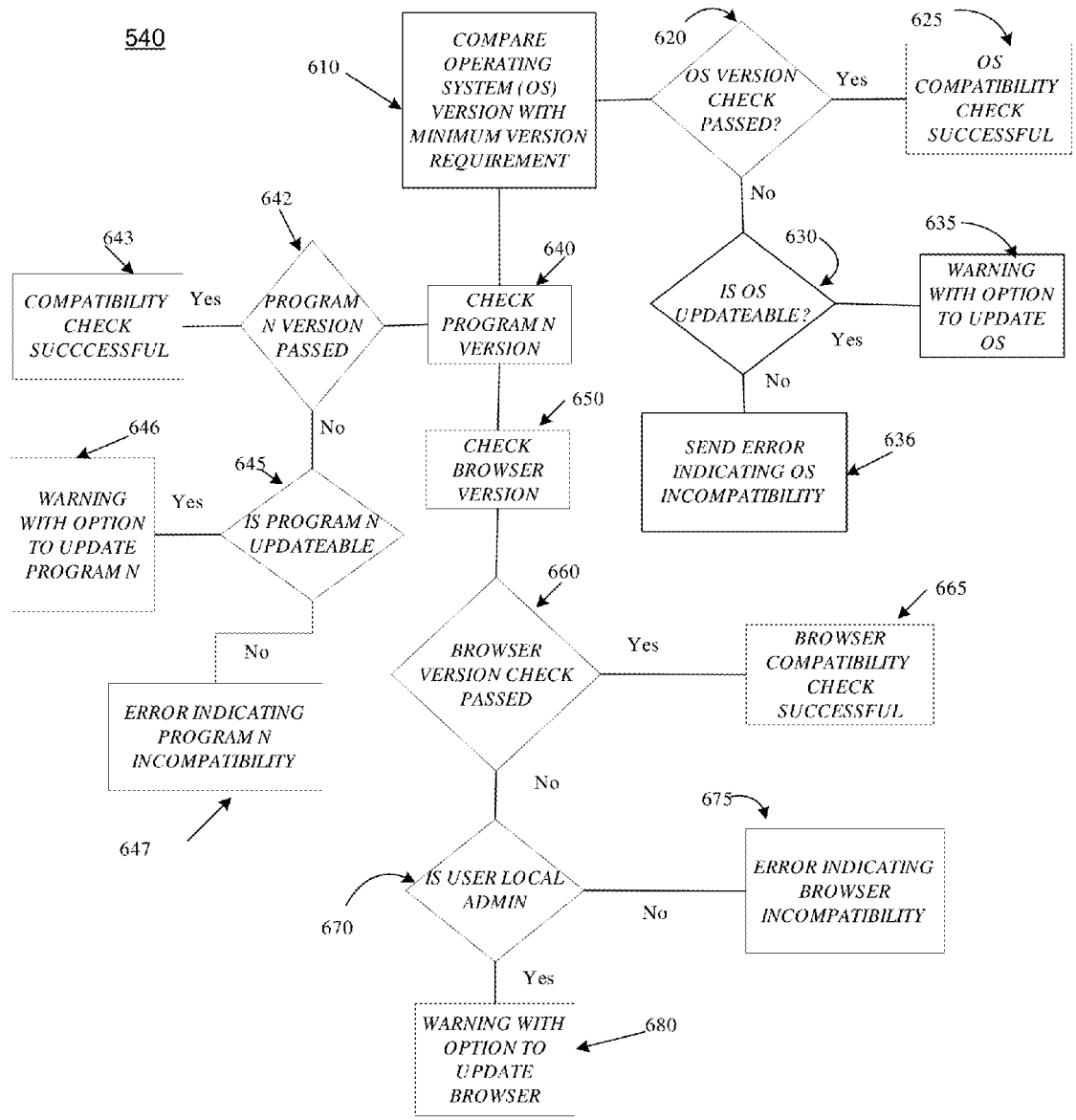
FIG. 6 illustrates an embodiment of a logic flow for collecting version information utilizing the desktop readiness tool.

FIG. 6 illustrates an embodiment of a logic flow 600 for the process step 540 shown in FIG. 5 of collecting version information from a client device utilizing the desktop readiness tool. The logic flow 600 may be representative of some or all of the operations executed by one or more embodiments described herein. In the illustrated embodiment shown in FIG. 6, the logic flow 600 compares the operating system version with a minimum version requirement at block 610. A determination is made at block 620 whether or not the operating system version passed the comparison with the minimum version requirement. If the operating system version check passed, the logic flow proceeds to block 625 where a result is generated that the compatibility check for the operating system was successful. If the operating system version check did not pass, then the logic flow proceeds to block 630 where a determination is made as to whether or not the operating system is updateable. If the operating system is updateable, then the logic flow proceeds to block 635 where a warning is generated that the operating system is not compatible with an indication that the operating system is updateable to satisfy the minimum version requirement. If the operating system is not updateable, then the logic flow proceeds to block 636 where an error message is sent indicating the incompatibility of the operating system.

In one embodiment, the logic flow 540 continues to block 640 where a check is performed to determine the compatibility of a version associated with a Program N. Program N may be any application program such as for example, a productivity suite and/or a particular application within the productivity suite. By way of further example, Program N may represent MICROSOFT OFFICE and/or may be MICROSOFT EXCEL, MICROSOFT OUTLOOK, or other application program within MICROSOFT OFFICE. A determination is made at block 642 whether or not the version of Program N passed the comparison with the minimum version requirement. If the Program N version check passed, the logic flow proceeds to block 643 where a result is generated that the compatibility check for the Program N was successful. If the Program N version check did not pass, then the logic flow proceeds to block 645 where a determination is made as to whether or not Program N is updateable. If the Program N is updateable, then the logic flow proceeds to block 646 where a warning is generated that Program N is not compatible with an indication that Program N is updateable to satisfy the minimum version requirement. If Program N is not updateable, then the logic flow proceeds to block 647 where an error message is sent indicating the incompatibility of the particular application program. It should be noted that the process to determine the compatibility of a version of a Program N proceeds back to block 640 for each additional program application version check necessary for a system level implementation and/or program update.

In one embodiment, the logic flow 540 continues to block 650 where a check is performed to determine the compatibility of a version associated with a web browser. The web browser may be an internet browser such as INTERNET EXPLORER. A determination is made at block 660 whether or not the version of the web browser passed the comparison with the minimum version requirement. If the web browser version check passed, the logic flow proceeds to block 665 where a result is generated that the compatibility check for the web browser was successful. If the web browser version check did not pass, then the logic flow proceeds to block 670 where a determination is made as to whether or not the user of the client device being examined is a local administrator. If the user of the client device being examined is a local administrator then the logic flow proceeds to block 680 where a warning is generated that the web browser is not compatible with an indication that is updateable in order to satisfy the minimum version requirement. If the user of the client device being examined is not a local administrator then the logic flow proceeds to block 675 where an error message is sent indicating the incompatibility of the particular web browser.

Figure 7:
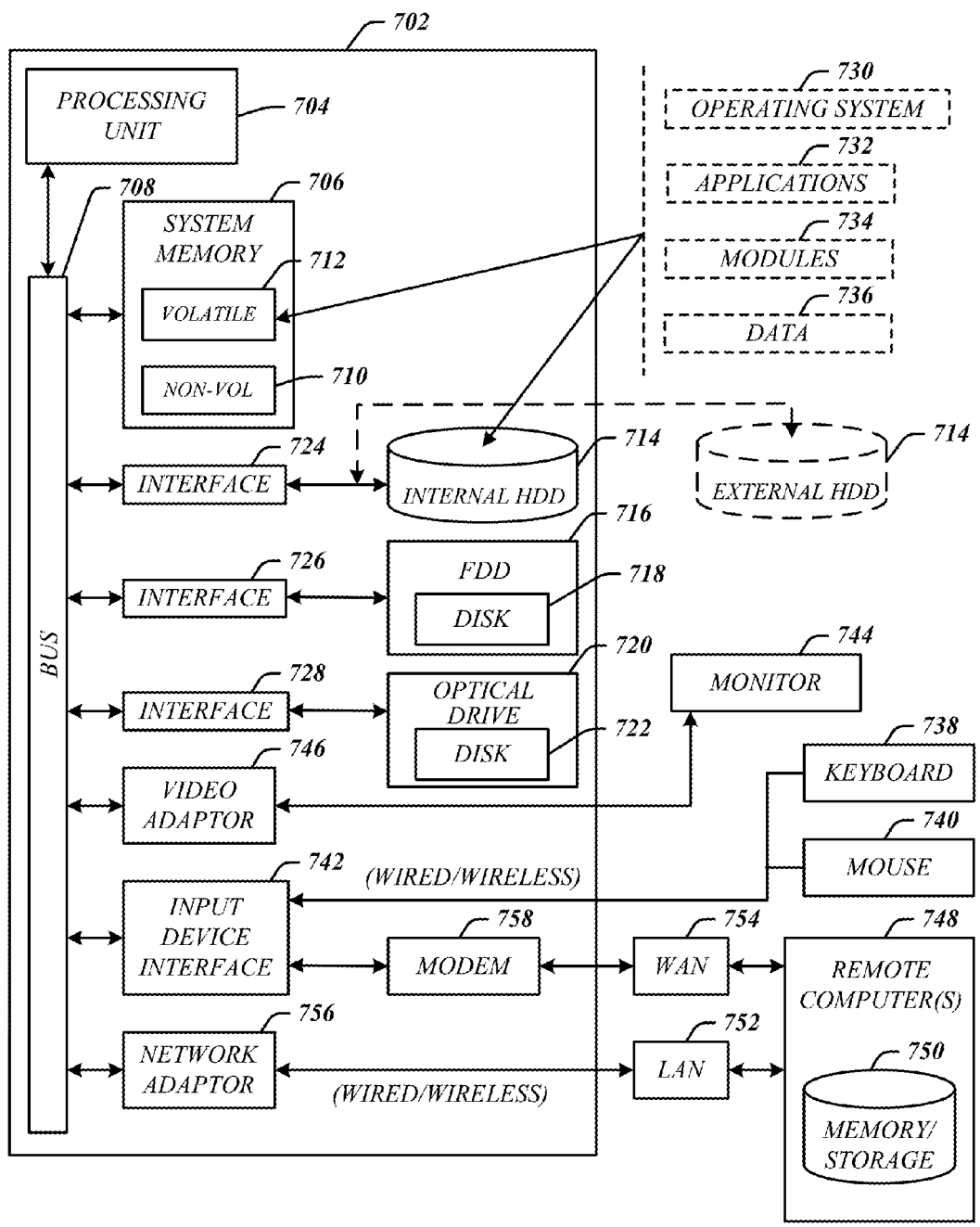
FIG. 7 illustrates an embodiment of a computing architecture.

FIG. 7 and the associated discussion are intended to provide a brief, general description of a suitable computing environment in which embodiments of the desktop readiness tool may be implemented. FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), randomaccess memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable storage media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, remote sharing module 160, image version module 170, etc.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, any piece of equipment or location associated with a wirelessly detectable tag, and phone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
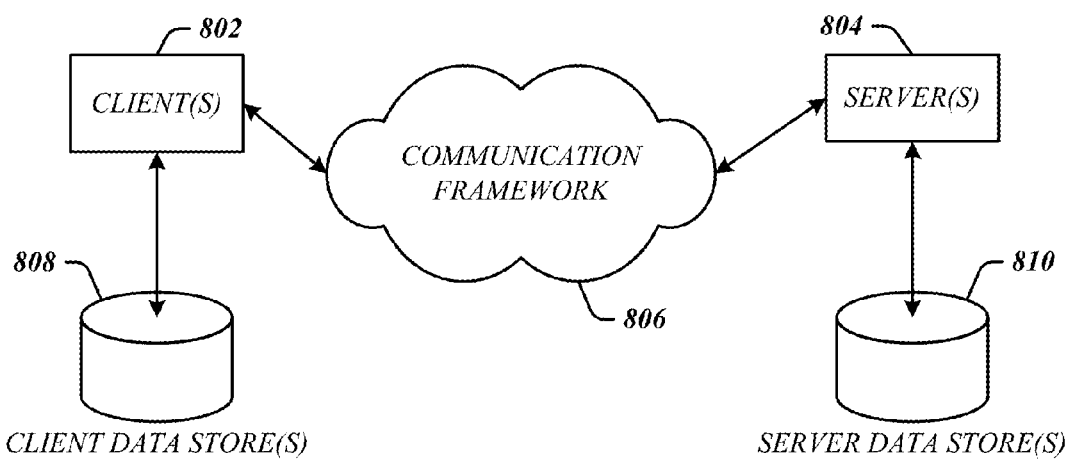
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client devices 110-1 . . . 110-N. The servers 804 may implement the server systems for web servers 120, 130, 150 and 160. The clients 802 (which may represent client devices 110-1 . . . 110-N) and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer implemented method comprising:
collecting information associated with determining compatibility of one or more programs resident on a client device by comparing the collected information with a minimum requirement for each of the one or more programs resident on the client device;

generating a request to access an anonymous webpage using an anonymous URL associated with the client device;

attaching a query string, including at least a portion of the collected information, to the request to access the anonymous webpage; and sending the request to access the anonymous webpage and the query string to a server supporting the anonymous webpage for storage within a web server log.

2. The computer implemented method of claim 1, wherein the collected information is current version information associated with the one or more programs resident on the client device.

3. The computer implemented method of claim 2, further comprising:

before attaching the query string to the request to access the anonymous webpage, adding a keyword prefix, representing a source of the current version information, to the query string.

4. The computer implemented method of claim 2, further comprising:

before sending the request to access the anonymous webpage and the query string, comparing the current version information associated with the one or more programs resident on the client device to a static minimum set of version values corresponding to each of the one or more programs resident on the client device.

5. The computer implemented method of claim 4, further comprising:

generating a machine state value associated with the client device based on the comparison of the collected information associated with the one or more programs resident on the client device to the static minimum set of version values, wherein if the current version information associated with the one or more programs resident on the client device meets the static minimum set of version values, the application generates a first machine state value and if the current version information associated with the one or more programs resident on the client device does not meet the static minimum set of version values, then the application generates a second machine state value different from the first.

6. The computer implemented method of claim 4, further comprising:

providing a notification, for each of said one or more programs resident on the client device, representing whether or not the current version information associated with the one or more programs resident on the client device is equal to or greater than the static minimum set of version values.

7. The computer implemented method of claim 5 further comprising providing a notification including one of the first or second machine state values.

8. The computer implemented method of claim 1, wherein the request to access the anonymous webpage corresponds to the anonymous URL defined in a configuration file associated with the client device.

9. The computer implemented method of claim 1, wherein the request to access the anonymous webpage is one of a plurality of requests and the client device is one of a plurality of client devices associated with an organization, each of the plurality of requests corresponding to a particular one of the plurality of client devices associated with the organization.

10. The computer implemented method of claim 1 wherein the query string is one of a plurality of query strings, each query string containing information associated with application programs resident on a corresponding client device.

11. The computer implemented method of claim 1 further comprising sending the collected information to a memory device associated with a network share.

12. Computer-readable storage hardware comprising instructions that, when executed, cause a system to:

collect version information associated with one or more programs resident on a client device;

generate a request to access an anonymous webpage using an anonymous URL associated with the client device;

attach a query string, including at least a portion of the collected version information, to the request to access the webpage; and send the request to access the anonymous webpage and the query string to a server supporting the anonymous webpage for storage within a web server log, the web server log operative to be a source for the collected version information.

13. The computer-readable storage hardware of claim 12, further comprising instructions that when executed enable the system to compare the collected version information associated with the one or more programs resident on the client device to a static minimum set of version values corresponding to each of the one or more programs.

14. The computer-readable storage hardware of claim 13, further comprising instructions that when executed enable the system to generate a machine state value associated with the client device based on the comparison of the collected version information associated with the one or more programs resident on the client device to a static minimum set of version values, wherein if the collected version information associated with the one or more programs resident on the client device meets the static minimum set of version values, the application generates a first machine state value and if the collected version information associated with the one or more programs resident on the client device does not meet the static minimum set of version values, then the application generates a second machine state value different from the first.

15. The computer-readable storage hardware of claim 14 further comprising instructions that when executed enable the system to provide a notification including one of the first or second machine state values.

16. The computer-readable storage hardware of claim 13, further comprising instructions that when executed enable the system to generate a notification indicating whether or not the collected version information associated with each of the one or more programs resident on the client device satisfies the static minimum set of version values.

17. The computer-readable storage hardware of claim 12, further comprising instructions that when executed enable the system to send the collected version information to a memory device associated with a network share.

18. An apparatus comprising:

a logic device;

a communications component operative on the logic device to receive a request to access an anonymous webpage, the request including a query string having version information associated with one of a plurality of programs resident on a client device; and a memory storage device operative to store the request to access the anonymous webpage and the query string in a web server log, the memory storage device further operative to determine readiness of the client device for an upgrade or a new component.

19. The apparatus of claim 18 wherein the query string includes a keyword prefix representing a source of the version information.

20. The apparatus of claim 18 wherein the version information stored in the web server log is indexed based on the keyword prefix.

* * * * *